(12) United States Patent
Mease et al.

(10) Patent No.: US 6,891,728 B1
(45) Date of Patent: May 10, 2005

(54) MODULAR COMPUTER SYSTEM AND MOUNTING ASSEMBLY THEREFOR

(75) Inventors: Keith D. Mease, Gibbstown, NJ (US); Norman K. Newman, Hatfield, PA (US)

(73) Assignee: Unisys Corporation, Blue Bell, PA (US)

( * ) Notice: Subject to any disclaimer, the term of this patent is extended or adjusted under 35 U.S.C. 154(b) by 135 days.

(21) Appl. No.: 10/390,420

(22) Filed: Mar. 17, 2003

(51) Int. Cl.⁷ .................................................. G06F 1/16
(52) U.S. Cl. ..................... 361/724; 361/683; 312/333; 439/160
(58) Field of Search ............................... 361/683–686, 361/724–727; 312/223.1, 333, 223.2; 439/157, 160

(56) References Cited

U.S. PATENT DOCUMENTS

| | | | |
|---|---|---|---|
| 4,939,622 A | * | 7/1990 | Weiss et al. ................. 361/727 |
| 4,954,928 A | * | 9/1990 | Jullien ........................ 361/684 |
| 5,790,373 A | * | 8/1998 | Kim et al. ................... 361/685 |
| 6,008,984 A | * | 12/1999 | Cunningham et al. ....... 361/685 |
| 6,137,684 A | * | 10/2000 | Ayd et al. ................... 361/727 |
| 6,171,120 B1 | * | 1/2001 | Bolich et al. ............... 361/683 |
| 6,181,552 B1 | * | 1/2001 | Neville et al. .............. 361/686 |
| 6,522,547 B1 | * | 2/2003 | Diaz et al. .................. 361/724 |
| 6,549,424 B1 | * | 4/2003 | Beseth et al. ............... 361/726 |

* cited by examiner

*Primary Examiner*—Lisa Lea-Edmonds
(74) *Attorney, Agent, or Firm*—Lise A. Rode; Mark T. Starr; RatnerPrestia

(57) ABSTRACT

A computer system is provided having a chassis at least partially defining an interior and an access opening. The interior of the chassis accommodates a connector that is oriented for connection along an insertion axis. The computer system also includes a subassembly configured for insertion into and removal from the interior of the chassis through the access opening along the insertion axis. The subassembly has a subassembly connector oriented for connection with the connector in the chassis along the insertion axis. The computer system also includes a mounting assembly configured for engaging the subassembly at least partially within the interior of the chassis and for connecting the connector in the chassis to the subassembly connector.

21 Claims, 11 Drawing Sheets

MODULAR COMPUTER SYSTEM AND MOUNTING ASSEMBLY THEREFOR

FIELD OF THE INVENTION

This invention relates to a computer system and, more particularly, a computer system including a mounting assembly configured for engaging a subassembly at least partially within an interior of a chassis of the computer system.

BACKGROUND OF THE INVENTION

For the serviceability of computer systems it is often desirable to provide for access to and removal of certain system components while maintaining operation of the remainder of the computer system. For example, in order to repair, replace, upgrade and trouble shoot components in a computer system, "hot-swappablity" of certain components is desirable. The ability to access and remove such components from the Input/Output (I/O) system is particularly desirable including PCI expansion cards such as network and disk control cards.

Certain rack-mounted computer systems have been provided with sliding drawers upon which the computer system can be provided in the rack. In order to access a part of the system such as the PCI module, the drawer is slid out to an accessible position. In a modular system, however, it may be desirable to allow for the coupling of the module to the remainder of the computer system by means of a connector assembly. There may be challenges, however, in configuring the computer system such that the connector of the module can be quickly and easily engaged with respect to the connector on the computer system.

Accordingly, it would be desirable to provide a modular computer system that is configured to facilitate releasable interconnection between a connector on the module and a connector within the computer system.

SUMMARY OF THE INVENTION

According to one aspect of this invention, a computer system is provided having a chassis at least partially defining an interior and an access opening. The interior of the chassis accommodates a connector that is oriented for connection along an insertion axis. The computer system also includes a subassembly configured for insertion into and removal from the interior of the chassis through the access opening along the insertion axis. The subassembly has a subassembly connector oriented for conne with the connector in the chassis along the insertion axis. The computer system also includes a mounting assembly configured for engaging the subassembly at least partially within the interior of the chassis and for connecting the connector in the chassis to the subassembly connector.

The mounting assembly of the computer system may include a cam follower and a cam surface configured to guide the cam follower. Movement of the cam follower along the cam surface urges coupling between the connector in the chassis and the subassembly connector.

According to another aspect of this invention, a method is provided for coupling a connector of a subassembly with a connector in a chassis of a computer system. The method includes inserting the subassembly into an interior of the chassis through an access opening along an insertion axis. A connector of the subassembly is advanced toward a connector of the chassis. A cam follower of the subassembly or chassis is positioned adjacent a cam surface of the chassis or subassembly. The subassembly connector is urged into an engagement with the connector in the chassis by moving the cam follower along the cam surface.

BRIEF DESCRIPTION OF THE DRAWINGS

Exemplary embodiments of the invention will be described with reference to the drawings, of which.

DETAILED DESCRIPTION OF THE INVENTION

Preferred features of selected embodiments of this invention will now be described with reference to the Figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

Figure 1:
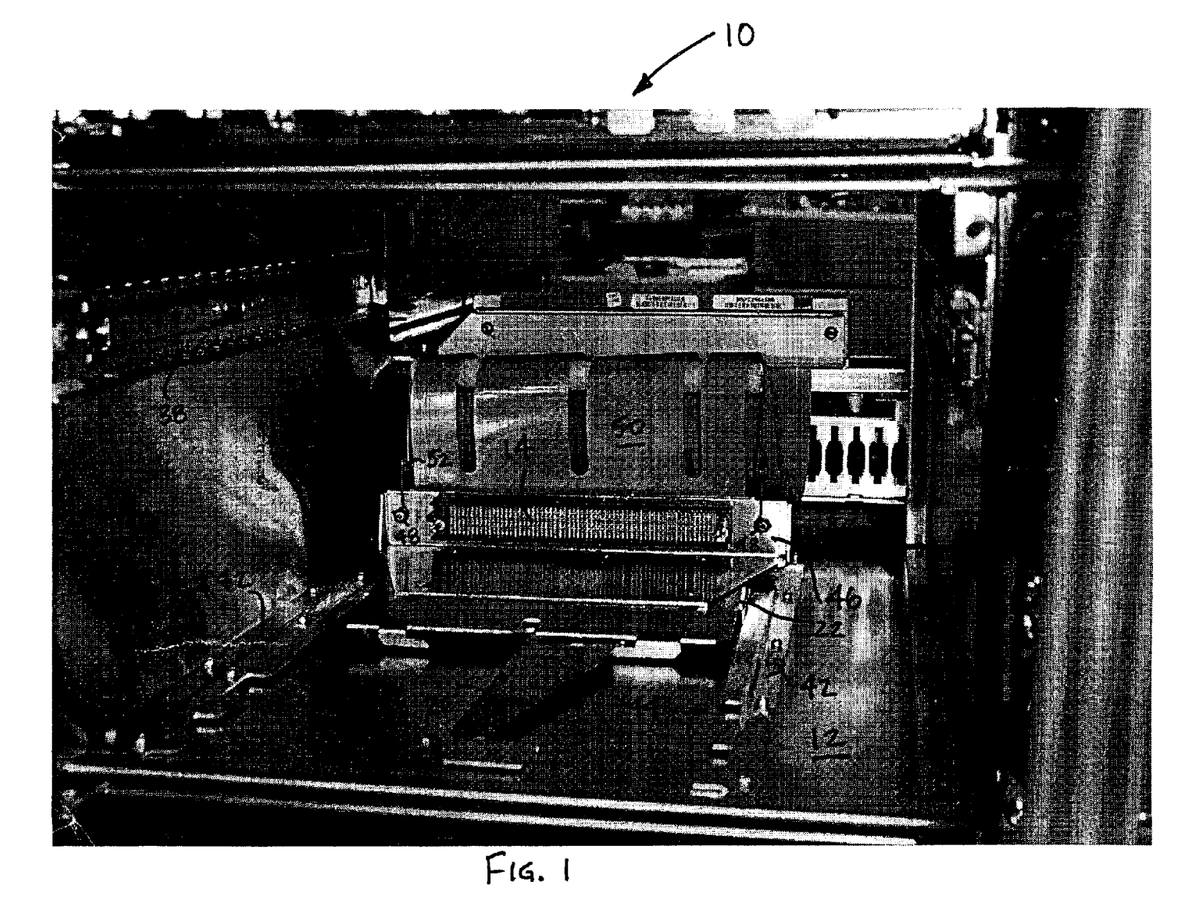
FIG. 1 is a perspective view illustrating an exemplary embodiment of an interior region of a computer system according to aspects of this invention.
Figure 2:
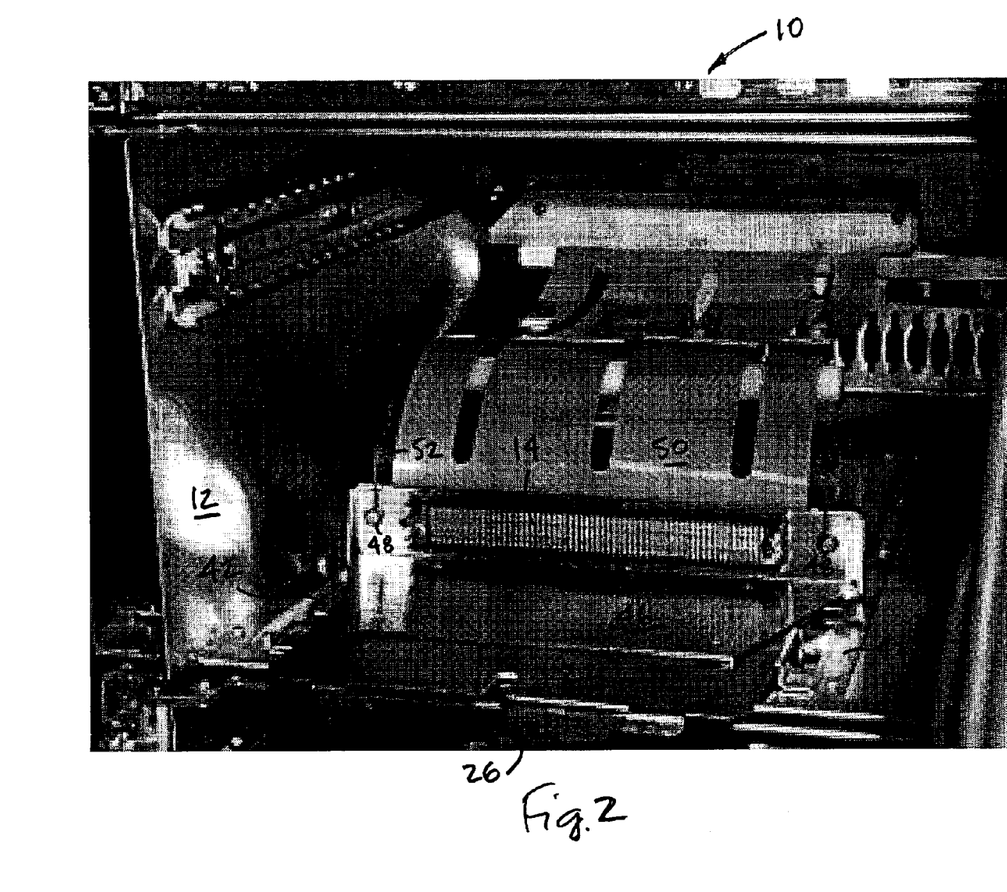
FIG. 2 is a perspective view of the computer system shown in FIG. 1, in a position adapted to receive a subassembly of the computer system.

Referring generally to the Figures, a computer system 10 is provided with a chassis 12 that at least partially defines an interior and an access opening (illustrated in FIGS. 1 and 2). The interior of the chassis accommodates a connector 14 oriented for connection along an insertion axis (extending into and out from the page in FIGS. 1 and 2). The computer system 10 also includes a subassembly 16 configured for insertion into and removal from the interior of the chassis 12 through the access opening along the insertion axis. The subassembly 16 has a subassembly connector 18 oriented for connection with the connector 14 in the chassis 12 along the insertion axis.

The computer system also includes a mounting assembly configured for engaging the subassembly 16 at least partially within the interior of the chassis 12 and for connecting the connector 14 in the chassis 12 to the subassembly connector 18. The mounting assembly includes a cam follower such as pin or cam follower 20. The mounting assembly also includes a cam surface 30 configured to guide the cam follower 20. Movement of the cam follower 20 along the cam surface 30 urges coupling between the connector 14 in the chassis 12 and the subassembly connector 18.

Generally, in use, the connector 18 of the subassembly 16 is coupled with the connector 14 in the chassis 12 of the computer system 10. The subassembly 16 is inserted at least partially into the interior of the chassis 12 through the access opening along the insertion axis. The connector 18 of the subassembly 16 is advanced toward the connector 14 of the chassis 12. The cam follower 20 of the subassembly 16 or chassis 12 is positioned adjacent a cam surface 30 of the chassis 12 or subassembly 16. The connector 18 of the subassembly 16 is urged into engagement with the connector 14 in the chassis 12 by moving the cam follower 20 along the cam surface 30.

Referring specially to FIG. 1, the computer system 10 has a chassis 12 in which a connector 14 is mounted for interconnection to a modular subassembly 16 (not shown in FIG. 1). The chassis 12 includes a pair of opposed guide receivers 38 that are positioned to receive the guides 40 of the subassembly 16 (shown in FIG. 3). Also, the chassis 12 of the computer system 10 includes a pair of aligned rails 42 that extend generally in the direction of the insertion axis of the subassembly 16. Each of the rails 42 of the chassis 12 defines a channel 44 together with a surface of the chassis 12. As will be discussed later in greater detail, the channels 44 defined by the rails 42 are sized and positioned to accommodate tabs 54 on a component of a mounting assembly of the computer system 10 (shown in FIG. 3).

The computer system 10 includes a mounting assembly having, among other components, a lever 26 pivotally connected to a base or cable carriage 22, a stiffening bracket 46 to support the connector 14 with respect to the mounting assembly, and fasteners 48 for mounting the stiffening bracket 46 to the base 22. The connector 14 mounted within the chassis 12 of computer system 10 is connected to other components within the computer system 10 by means of a flex circuit 50.

Referring now to FIG. 2, the computer system 10 shown in FIG. 1 is re-oriented into a configuration in which the mounting assembly and connector 14 are positioned to receive the subassembly 16 (not shown) for engagement. Specifically, as shown in FIG. 2, the base 22 of the mounting assembly is slid forward with respect to the chassis 12 and toward the access opening by means of sliding movement of the tabs 54 of the base 22 in the channels 44 defined by the rails 42. As illustrated in FIG. 2, a spring assembly 52 that is connected by means of fasteners 48 to the stiffening bracket 46 and base 22 of the mounting assembly holds the flex circuit 50 in a position such that it can be repeatedly returned to the configuration shown in FIG. 1 when the mounting assembly is slid rearwardly into or toward the interior of the chassis 12.

Figure 3:
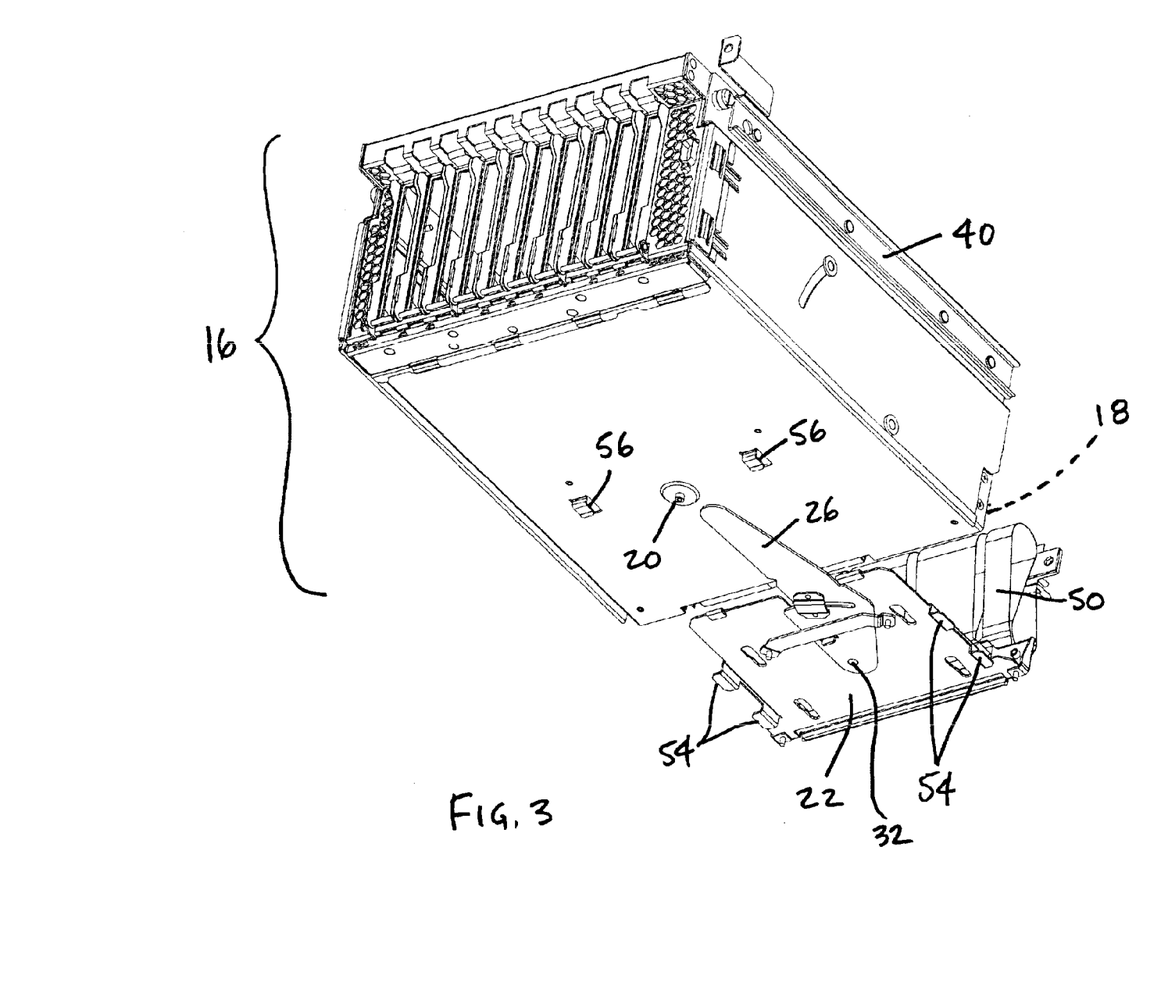
FIG. 3 is a perspective view of exemplary embodiments of components of a computer system according to aspects of this invention.

Referring now to FIG. 3, a perspective view of the subassembly 16 and the mounting assembly is provided. As alluded to previously, the subassembly 16 has a pair of opposed guides 40 (only one shown in FIG. 3) that meet with the guide receivers 38 of the chassis 12 of the computer system 10. The guides 40 and guide receivers 38 ensure that the subassembly 16 moves with respect to the chassis 12 generally along the insertion axis.

The subassembly 16 also includes a pair of tabs 56 that are configured and positioned to receive a front portion of the base or cable carriage 22. The engagement between tabs 56 and the base 22 is better illustrated in FIGS. 4A and 4B. Specifically, in FIG. 4B, a leading edge of the base 22 extends into the gap defined between the bottom surface of the subassembly 16 and upper surface of the tabs 56, thereby providing support and alignment features.

The subassembly 16 also includes a pin or cam follower 20 that is positioned and sized to fit within a slot 24 provided in the base 22 of the mounting assembly. Pin or cam follower 20 forms a component of the mounting assembly. Although pin or cam follower 20 is shown as a component of the subassembly 16, it will be appreciated that the pin or cam follower 20 can also be positioned on another component (such as the lever 26 or base 22) with the slot 24 being moved to the subassembly 16.

The mounting assembly shown in FIG. 3 includes an embodiment of a lever 26 that is mounted by means of a pivot 32 to the base or cable carriage 22. The lever 26 can pivot with respect to the base about an axis defined by the pivot 32. The tabs 54 of the base 22 are also illustrated (four shown). While four substantially rectangular tabs 54 are shown in FIG. 3, it will be appreciated that any number of tabs 54 having any number of configurations and shapes can be used. Also shown in FIG. 3 is the flex circuit 50 as well as the subassembly connector 18 that is oriented to be mounted and engaged with connector 14 in the chassis 12.

Figure 4A:
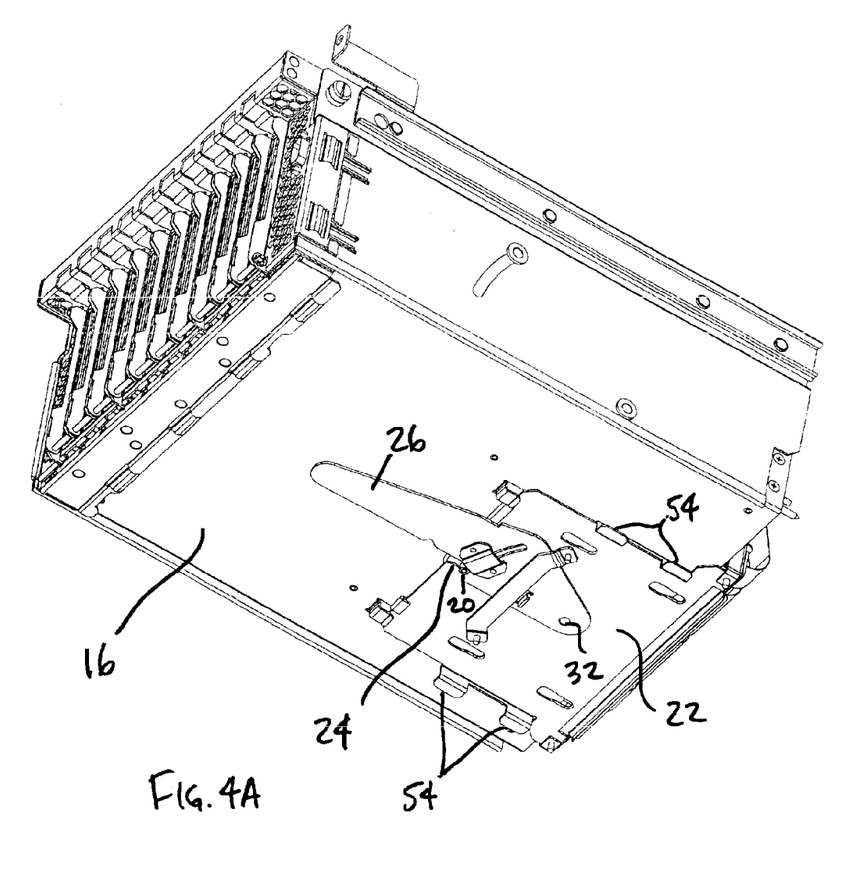
FIG. 4A is another perspective view of the components shown in FIG. 3.
Figure 4B:
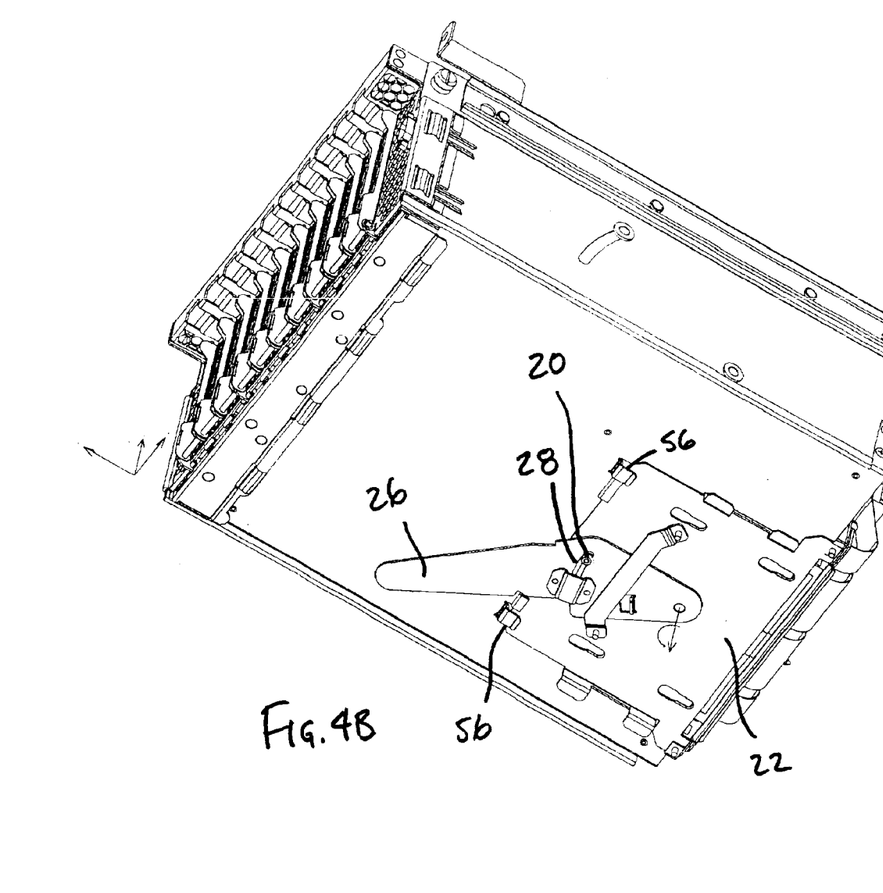
FIG. 4B is a perspective view of the computer system shown in FIG. 4A, in a second position.

In FIG. 4A, the pin or cam follower 20 of the subassembly 16 is shown within the slot 24 formed in the base 22 of the mounting assembly. In the position illustrated in FIG. 4A, the lever is in a releasing position in which the slot 28 of the lever 26 does not engage the cam follower 20 though the cam follower 20 may be within the slot 24 of the base 22. The lever 26 also has an engaging position (FIG. 4B) in which the slot 28 of the lever 26 engages the cam follower 20 while the cam follower 20 is also within the slot 24 of the base 22.

Figure 5:
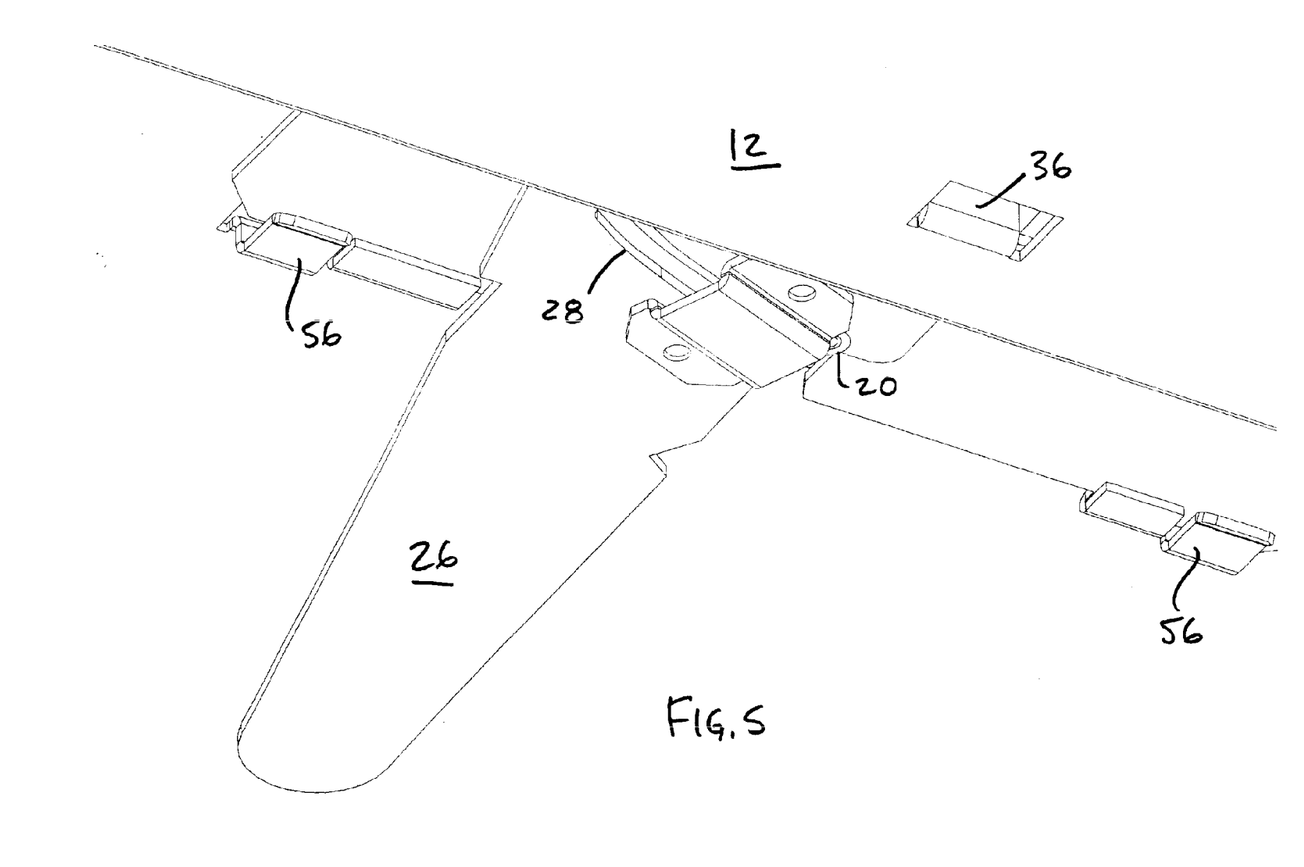
FIG. 5 is a perspective view of a portion of the computer system illustrated in FIGS. 3, 4A, and 4B.

Referring now to FIG. 5, which shows a detailed perspective view of a portion of the computer system 10, and more specifically a portion of the mounting assembly for computer system 10, a tab 36 is provided in a surface of the chassis 12 and is oriented to extend into the interior of the chassis 12. Tab 36 provides for engagement between the lever 26 and/or base 22 of the mounting assembly and the chassis 12. The engagement between the tab 36 of the chassis 12 and the mounting assembly helps to facilitate the coupling of the connectors, as described below.

It has been discovered that it is beneficial to hold the mounting assembly in position when the subassembly 16 is being installed into the interior of the chassis 12 of the computer system 10 so that the insertion force necessary to engage the subassembly connector 18 to the connector 14 in the chassis 12 can be generated. In other words, if the sliding base or cable carriage 22 were permitted to move with respect to the chassis 12 during Insertion of the subassembly 16, thereby permitting respective movement of the connector 14 in the chassis 12, then the force needed to engage the connectors 14 and 18 to one another could not be easily generated.

Accordingly, when the mounting assembly is in a position to receive the subassembly 16 for the engagement of the connectors (as in FIG. 2), the mounting assembly is preferably held in position during mating process. At the same time, however, it is advantageous to move the mounting assembly inwardly toward an interior region of the chassis 12 of the computer system 10 after the subassembly 16 is engaged and the connectors 14 and 18 are mated. Such movement of the subassembly 16 together with the mounting assembly makes it possible to move the subassembly 16 with respect to the chassis 12 while the computer system 10 is operating and the subassembly 16 is operatively connected to the computer system 10.

Referring again to FIGS. 1 and 2, the movement of the mounting assembly from the position in FIG. 1 to the position in FIG. 2 and back again, while the computer system 10 is operating, allows for access to the interior of the subassembly 16 to replace or maintain cards that may be stored therein. For example, if the mounting assembly with the subassembly 16 installed was moved from the position shown in FIG. 1 to the position shown in FIG. 2, access could be gained to the interior of the subassembly 16 while the computer is still operating.

Referring back to FIG. 5 the detent 34 on the lever 26 extends in the direction away from subassembly 16 and into a position that interferes with the tab 36 formed in the chassis 12 when the lever 26 is in the releasing position. Accordingly, when the lever 26 is in the releasing position for the withdrawal or insertion of the cam follower 20 of the subassembly 16, the detent 34 of the lever 26 is engaged with or interferes with the tab 36 formed in the chassis 12, thereby preventing movement of the mounting assembly toward the interior of the chassis 12. When the lever is moved to the engaging position shown in FIG. 4B, however, the detent 34 of the lever 26 is pivoted out of the way of the tab 36 of the chassis 12, thereby permitting sliding movement of the mounting assembly (and the engaged subassembly 16) inwardly toward the central region of the chassis 12.

Figure 6:
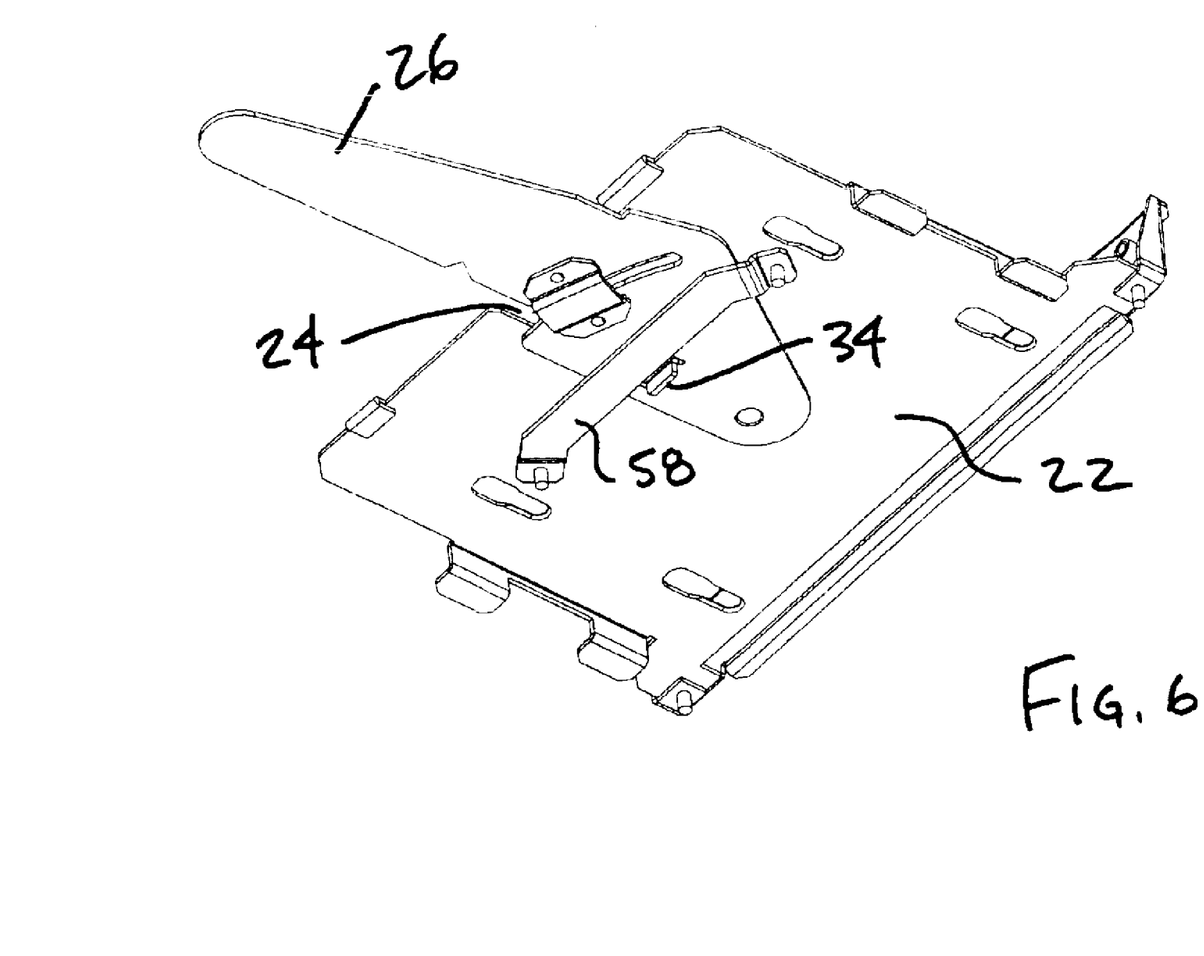
FIG. 6 is a perspective view of an exemplary embodiment of components of a mounting assembly adapted for use in connection with a computer system according to aspects of this invention.

Referring now to FIG. 6, a support 58 is engaged to the bottom surface of the base 22 of the mounting assembly in order to both support the engagement between lever 26 and the base 22 and to limit the range of motion of the lever 26 with respect to the base 22. The support 58 is configured and positioned in order to limit movement of the lever 26 beyond the releasing position shown in FIG. 4A, to limit the movement of the lever 26 beyond the engaging position shown in FIG. 4B, and to guide the movement of the lever 26 between those positions.

By virtue of the support 5B, the leading edge of the lever 26 is substantially aligned with an edge of the slot 24 in the base 22 when the lever 26 is in the substantially releasing position. Similarly, the support 58 is positioned and configured in order to permit the lever 26 to travel completely to the engaging position with the pin 20 fully or almost fully inserted into the slot 28 formed in the lever 26.

Figure 7:
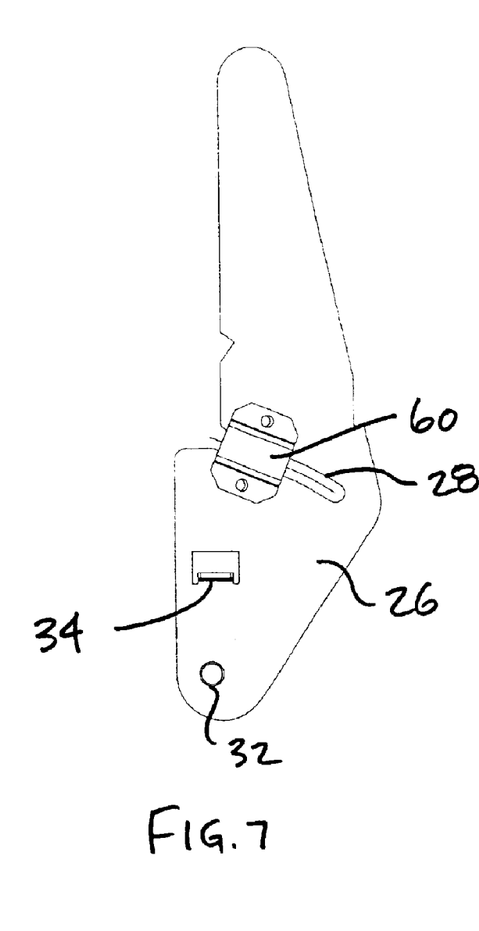
FIG. 7 is a top view of an exemplary embodiment of a lever assembly according to aspects of this invention.
Figure 8:
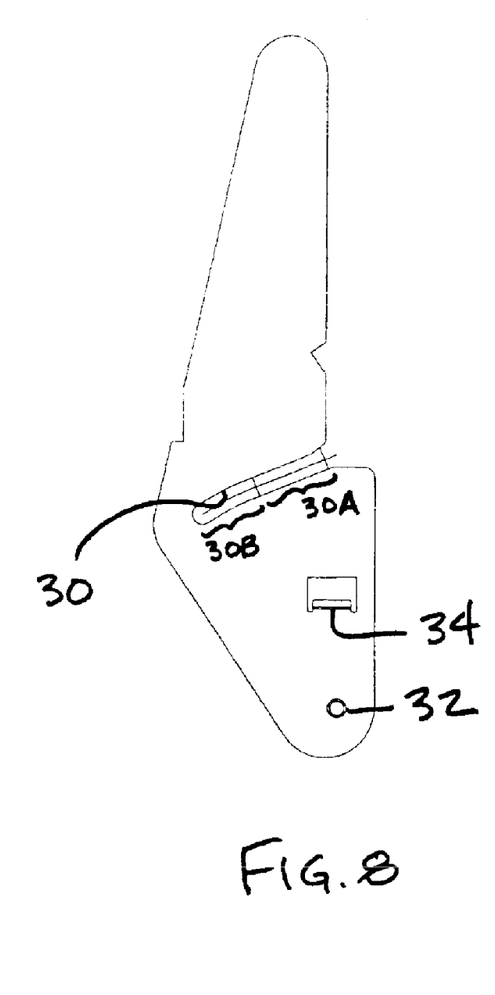
FIG. 8 is a bottom view of the lever assembly shown in FIG. 7.

Referring now to FIGS. 7 and 8, details of an exemplary embodiment of a lever 26 are illustrated. In the top view shown in FIG. 7, the lever 26 includes a cover 60 that is intended to support the portions of the lever 26 on either side of the slot 28 to add structural strength to the lever 26. Also shown in FIG. 7 is the pivot 32 of the lever 26 about which the lever 26 rotates with respect to the base 22. Various configurations can be selected for the lever 26. For example, the shape of the lever and the orientation of the slot 28 and detent 34 can be modified according to design constraints. Also, although the slot 28 is formed in the lever 26 for receiving the cam follower 20, the cam follower could be moved to the lever and the slot could be moved to another component. Also, the cam surface 30 defined by the slot 28 (FIG. 8) need not be defined by a slot but may be formed by another surface.

As shown in FIG. 8, the cam surface 30 formed in the slot 28 of the lever 26 may be provided with two portions: a first portion 30A extending from the base of the slot 28 and a second portion 30B extending from the first portion 30A to the terminal end of the slot 28. The cam surface portions 30A and 30B provide for different insertion forces and characteristics. In the embodiment shown in FIG. 8, the first portion 30A is substantially straight, resulting in a somewhat direct relationship between the pivoting movement of the lever 26 with respect to the chassis 12 and the resulting movement of the subassembly 16 with respect to the chassis 12 along the insertion axis. As the pin 20 follows the cam surface portion 30A, the connector 18 of the subassembly 16 approaches engagement with the connector 14 in the chassis 12.

The second portion 30B curves slightly toward the pivot 32, resulting in a modified relationship between the pivoting movement of the lever 26 with respect to the chassis 12 and the resulting movement of the subassembly 16 with respect to the chassis 12 along the insertion axis. As the pin 20 follows the cam surface portion 30B and the lever 26 advances toward the engaging position, the necessary insertion force is generated to engage the connector 18 of the subassembly 16 with the connector 14 in the chassis 12. Similarly, as the pin 20 follows the cam surface portion 30B in the opposite direction and the lever 26 advances toward the releasing position from the engaging position, the necessary force is generated to disengage the connector 18 of the subassembly 16 from the connector 14 in the chassis 12.

Accordingly, the contours of the slot 28 and the cam surface 30 can be selected to provide for staged movement of the subassembly 16 with respect to the chassis 12. The angles and curvatures of the cam surface 30 can therefore be modified in order to arrive at the desired force and travel of the cam follower 20 as the pivotal movement of the lever 26 is translated to the linear movement of the subassembly 16 along the insertion axis.

Figure 9:
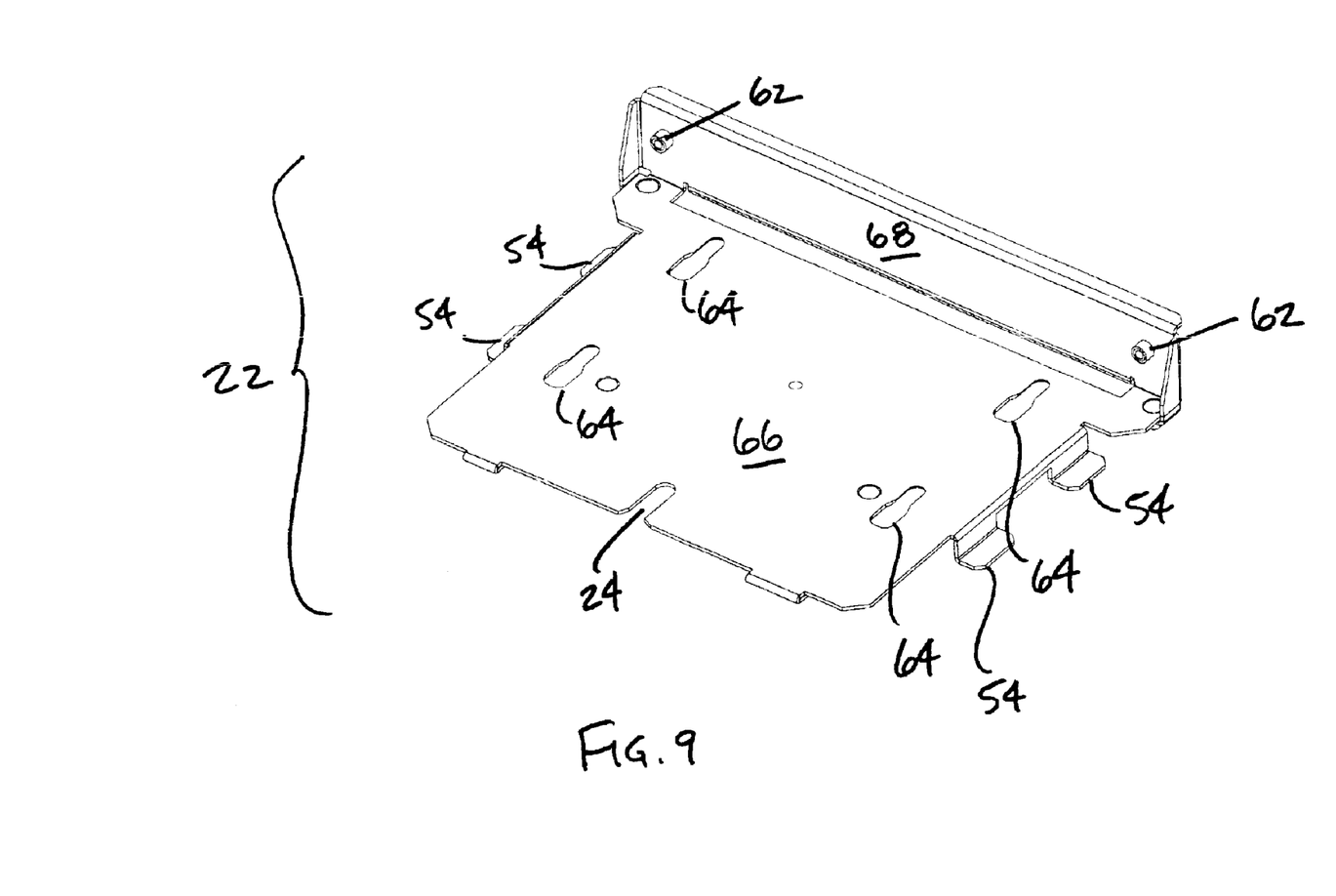
FIG. 9 is a perspective view of an embodiment of a base component of the mounting assembly according to aspects of this invention.
Figure 10:
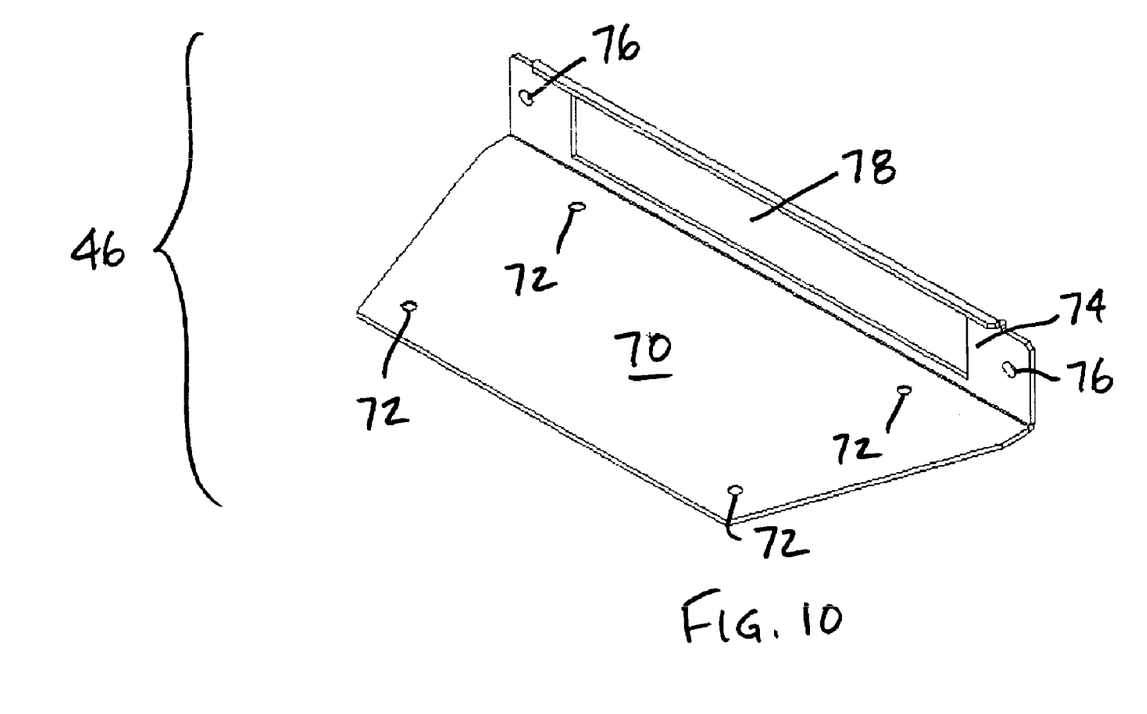
FIG. 10 is a perspective view of a stiffening bracket component of the mounting assembly according to aspects of this invention.

Referring now to FIG. 9, the base 22 of the mounting assembly includes a base portion 66 having mounting slots 64 for engaging the base portion 66 of the base 22 to the stiffening bracket 46 (shown in FIG. 10). Base 22 also has a connector-mounting portion 68, which accommodates the connector 14. The connector-mounting portion 68 includes a pair of mounting studs 62 for mounting of the stiffening bracket 46 to the base 22 and for mounting the spring assembly 52 to the mounting assembly.

Referring to FIG. 10, the stiffening bracket 46 includes a base portion 70 to be positioned along the base portion 66 of the base 22. In base portion 70, stud mounting holes 72 (four shown) are provided for mounting studs (not shown) that engage corresponding mounting slots 64 in the base portion 66 of the base 22. The stiffening bracket 46 also has a connector mounting portion 74 to be positioned adjacent the connector mounting portion 68 of base 22. The connector mounting portion 74 has fastener apertures 76 (two shown) as well as a connector aperture 78 sized to accommodated the connector 14 in the chassis 12.

Although this invention has been described with reference to computer systems, it is recognized that this invention can also be utilized in other modular systems. Also, although this invention has been described with reference to various embodiments and modifications to those embodiments, it will be appreciated that other modifications can be made to the illustrated embodiments without departing from the scope of this invention, which is separately defined in the appended claims.

What is claimed is:

1. A computer system, comprising:
   a chassis at least partially defining an interior and an access opening, said interior of said chassis accommodating a connector oriented for connection along an insertion axis;

a subassembly configured for insertion into and removal from said interior of said chassis through said access opening along said insertion axis, said subassembly having a subassembly connector oriented for connection with said connector in said chassis along said insertion axis; and a mounting assembly configured for releasably engaging said subassembly at least partially within said interior of said chassis and for connecting said connector in said chassis to said subassembly connector, said mounting assembly including:

a cam follower; and a cam surface configured to guide said cam follower;

wherein movement of said cam follower along said cam surface urges coupling between said connector in said chassis and said subassembly connector.

2. The computer system recited in claim 1, said cam follower being mounted to said subassembly.

3. The computer system recited in claim 1, said cam surface being defined by said mounting assembly.

4. The computer system recited in claim 1, said mounting assembly further including a lever mounted for pivotal movement with respect to said chassis, wherein said cam surface is defined by said lever.

5. The computer system recited in claim 4, said cam surface being defined by a slot formed in said lever.

6. The computer system recited in claim 4, said lever having a portion configured to be grasped by a user of the computer system.

7. A computer system comprising:

a chassis at least partially defining an interior and an access opening, said interior of said chassis accommodating a connector oriented for connection along an insertion axis;

a subassembly configured for insertion into and removal from said interior of said chassis through said access opening along said insertion axis, said subassembly having a subassembly connector oriented for connection with said connector in said chassis along said insertion axis; and a mounting assembly configured for engaging said subassembly at least partially within said interior of said chassis and for connecting said connector in said chassis to said subassembly connector, said mounting assembly including:

a cam follower;

a cam surface configured to guide said cam follower; and a lever mounted for pivotal movement with respect to said chassis, wherein said cam surface is defined by said lever, movement of said cam follower along said cam surface urges coupling between said connector in said chassis and said subassembly connector, and said lever is pivotable between a releasing position in which said slot does not engage said cam follower and an engaging position in which said slot engages said cam follower.

8. The computer system recited in claim 7, said lever having a detent positioned to engage a surface of said chassis to prevent movement of at least a portion of said mounting assembly with respect to said chassis along said insertion axis when said lever is in said releasing position, wherein said detent releases said mounting assembly for movement with respect to said chassis to permit movement of said mounting assembly with respect to said chassis along said insertion axis when said lever is in said engaging position.

9. A computer system, comprising:

a chassis at least partially defining an interior and an access opening, said interior of said chassis accommodating a connector oriented for connection along an insertion axis;

a subassembly configured for insertion into and removal from said interior of said chassis through said access opening along said insertion axis, said subassembly having a subassembly connector oriented for connection with said connector in said chassis along said insertion axis; and a mounting assembly configured for engaging said subassembly at least partially within said interior of said chassis and for connecting said connector in said chassis to said subassembly connector, said mounting assembly including:

a cam follower;

a cam surface configured to guide said cam follower; and a base mounted for sliding movement with respect to said chassis along said insertion axis;

wherein movement of said cam follower along said cam surface urges coupling between said connector in said chassis and said subassembly connector.

10. The computer system recited in claim 9, said connector in said chassis being mounted to said base of said mounting assembly.

11. The computer system recited in claim 9, said base defining a slot oriented substantially parallel to said insertion axis and positioned to receive said cam follower of said mounting assembly.

12. A computer system, comprising:

a chassis at least partially defining an interior and an access opening, said interior of said chassis accommodating a connector oriented for connection along an insertion axis;

a subassembly configured for insertion into and removal from said interior of said chassis through said access opening along said insertion axis, said subassembly having a subassembly connector oriented for connection with said connector in said chassis along said insertion axis; and a mounting assembly configured for engaging said subassembly at least partially within said interior of said chassis and for connecting said connector in said chassis to said subassembly connector, said mounting assembly including:

a cam follower mounted to said subassembly;

a base mounted for sliding movement with respect to said chassis along said insertion axis; and a lever having a slot defining a cam surface configured to guide said cam follower of said subassembly, said lever being mounted for pivotal movement with respect to said base between a releasing position in which said slot does not engage said cam follower and an engaging position in which said slot engages said cam follower, wherein movement of said cam follower along said cam surface urges coupling between said connector in said chassis and said subassembly connector.

13. The computer system recited in claim 12, said base defining a slot oriented substantially parallel to said insertion axis and positioned to receive said cam follower of said subassembly.

14. The computer system recited in claim 12, said lever also having a detent positioned to engage a surface of said chassis to prevent movement of said base with respect to said chassis along said insertion axis when said lever is in said releasing position, said detent being positioned to release said surface of said chassis to permit movement of said base with respect to said chassis along said insertion axis when said lever is in said engaging position.

15. A computer system, comprising:
    a chassis at least partially defining an interior and an access opening, said interior of said chassis accommodating a connector oriented for connection along an insertion axis;
    a subassembly configured for insertion into and removal from said interior of said chassis through said access opening along said insertion axis, said subassembly having a subassembly connector oriented for connection with said connector in said chassis along said insertion axis; and
    a mounting assembly configured for engaging said subassembly at least partially within said interior of said chassis and for connecting said connector in said chassis to said subassembly connector, said mounting assembly including:
    a cam follower mounted to said subassembly;
    a base mounted for sliding movement with respect to said chassis along said insertion axis, said base defining a slot oriented substantially parallel to said insertion axis and positioned to receive said cam follower of said subassembly; and
    a lever having a slot defining a cam surface configured to guide said cam follower of said subassembly, said lever being mounted for pivotal movement with respect to said base between a releasing position in which said slot does not engage said cam follower and an engaging position in which said slot engages said cam follower, wherein movement of said cam follower along said cam surface urges coupling between said connector in said chassis and said subassembly connector, said lever also having a detent positioned to engage a surface of said chassis to prevent movement of said base with respect to said chassis along said insertion axis when said lever is in said releasing position, said detent being positioned to release said surface of said chassis to permit movement of said base with respect to said chassis along said insertion axis when said lever is in said engaging position.

16. A method for coupling a connector of a subassembly with a connector in a chassis of a computer system, said method comprising the steps of:
    (a) inserting the subassembly at least partially into an interior of the chassis through an access opening along an insertion axis;
    (b) advancing a subassembly connector of the subassembly toward a chassis connector of the chassis;
    (c) positioning a cam follower of the subassembly or chassis adjacent a cam surface of the chassis or subassembly; and
    (d) urging the subassembly connector into engagement with the connector in the chassis by moving the cam follower along the cam surface.

17. The method recited in claim 16, further comprising the step of sliding a base of a mounting assembly with respect to the chassis along the insertion axis.

18. The method recited in claim 17, said urging step comprising pivoting a lever with respect to the base between a releasing position in which a cam surface defined by the lever does not engage the cam follower and an engaging position in which the cam surface engages the cam follower, wherein movement of the cam follower along the cam surface urges coupling between the connector in the chassis and the subassembly connector.

19. The method recited in claim 18, said positioning step comprising positioning the cam follower in a slot formed in the lever and defining the cam surface.

20. A method for coupling a connector of a subassembly with a connector in a chassis of a computer system, said method comprising the steps of:
    (a) inserting the subassembly into an interior of the chassis through an access opening along an insertion axis;
    (b) advancing a subassembly connector of the subassembly toward a chassis connector of the chassis;
    (c) positioning a cam follower of the subassembly adjacent a cam surface, the cam surface being formed by a slot in a lever of the mounting assembly; and
    (d) urging the subassembly connector into engagement with the connector in the chassis by pivoting the lever with respect to the chassis from a releasing position in which the cam surface does not engage the cam follower to an engaging position in which the cam surface engages the cam follower, thereby moving the cam follower along the cam surface and coupling the connector in the chassis to the subassembly connector.

21. A computer system comprising:
    a chassis at least partially defining an interior and an access opening, said interior of said chassis accommodating a connector oriented for connection along an insertion axis;
    a subassembly configured for insertion into and removal from said interior of said chassis through said access opening along said insertion axis, said subassembly having a subassembly connector oriented for connection with said connector in said chassis along said insertion axis; and
    a mounting assembly configured for engaging said subassembly at least partially within said interior of said chassis and for connecting said connector in said chassis to said subassembly connector, said mounting assembly including:
    a cam follower; and
    a lever pivotably mounted to the mounting assembly and including a slot formed therein to guide said cam follower;
    wherein movement of said cam follower along said slot urges coupling between said connector in said chassis and said subassembly connector.

* * * * *